United States Patent [19]
Luxnat

[11] 3,878,744
[45] Apr. 22, 1975

[54] CUTTING METHOD AND APPARATUS WITH SAW BLADE DEFLECTION

[75] Inventor: Gustav Friedrich Luxnat, Davis, Ill.

[73] Assignee: Metalcut International Incorporated, Rockford, Ill.

[22] Filed: May 8, 1974

[21] Appl. No.: 468,083

[52] U.S. Cl. ............ 83/27; 83/113; 83/488; 83/542; 83/556; 83/821
[51] Int. Cl. .............................. B23d 45/10
[58] Field of Search ....... 83/27, 113, 488, 542, 556, 83/821

[56] References Cited
UNITED STATES PATENTS

| | | |
|---|---|---|
| 3,572,200 | 3/1971 | Allison et al. .......................... 83/27 |
| 3,709,075 | 1/1973 | Goellner ................................. 83/27 |
| 3,752,023 | 8/1973 | Allison et al. .......................... 83/27 |

*Primary Examiner*—Frank T. Yost
*Attorney, Agent, or Firm*—Burns, Doane, Swecker & Mathis

[57] ABSTRACT

A cutting machine and method wherein interaction between a workpiece and a returning saw blade is avoided by moving one severed workpiece portion away from the location of the cut and directing fluid under pressure toward the rotating blade to deflect the blade away from the remaining workpiece portion. The blade is retracted while maintaining the blade in a deflected condition out of contact with the workpiece portion adjacent the location of the cut.

23 Claims, 6 Drawing Figures

# CUTTING METHOD AND APPARATUS WITH SAW BLADE DEFLECTION

BACKGROUND OF THE INVENTION

This invention relates to cutting operations involving return movement of a cutting tool from the location where a workpiece is severed without interaction between the cutting tool and the workpiece. More particularly, this invention relates to a cutting apparatus and method wherein such interaction is avoided without the need for moving all the severed workpiece portions.

In U. S. Pat. Nos. 3,572,200 (issued Mar. 23, 1971), 3,709,075 (issued Jan. 9, 1973), and 3,752,023 (issued Aug. 14, 1973) there are disclosed cutting machines which avoid interaction between severed workpiece portions and a retracting carbide tipped saw blade by moving the severed workpiece portions away from the location of cut prior to return of the saw blade toward its initial position. To accomplish this, a slide mounted clamp is employed to move one of the severed workpiece portions, and another slide mounted clamp or any suitable conveyor means is employed to move the other workpiece portion.

Although the techniques disclosed in the aforementioned patents for avoiding workpiece and returning saw blade interaction are advantageous, it will be appreciated that the need for transporting both workpiece portions on opposite sides of the cutting zone away from that cutting zone gives rise to a need for workpiece transporting equipment that adds to cost, maintenance and bulk of the cutting machine. Moreover, that need places some constraints on the ability to cut workpieces (from the standpoint of multiple, substantially simultaneous cuts), while still avoiding workpiece and saw blade interaction during return movement of the blade relative to the severed workpiece portions.

For example, if a single blade were employed to sever a plurality of workpieces simultaneously, provision would have to be made to transport all of the severed portions of each workpiece so as to accomodate blade return without interaction. In addition, if a single workpiece or multiple workpieces were to be simultaneously severed at more than one location by concurrently operable blades, it would be difficult, if at all practical, to transport the severed workpiece portion located between the two blades away from both cutting zones adjacent its ends.

OBJECTS AND SUMMARY OF PREFERRED FORMS OF THE INVENTION

Recognizing the desirability of avoiding interaction between a workpiece and a returning cutting tool, it is a general object of the present invention to provide a novel method and apparatus wherein such interaction is avoided without the need for transporting all the severed workpiece portions away from the cutting zone.

It is a particular object of the present invention to provide such a novel method and apparatus particularly adaptable to operations involving substantially simultaneous cuts.

It is a further object of the present invention to provide such a novel method and apparatus wherein one of the workpiece portions on one side of the cut is moved away from the location of the cut, and the cutting tool is deflected away from the location of the workpiece portion on the other side of the cut prior to retraction.

It is still another object of the present invention to provide such a method and apparatus wherein the cutting tool is deflected by directing fluid under pressure against the tool.

In preferred embodiments of the invention intended to accomplish the foregoing objects, relative traversing movement between a rotating saw blade and the workpiece is effected to sever the workpiece into two portions, one of these portions on one side of the cut location is moved away from that location, the rotating blade is deflected away from the other workpiece portion on the other side of the cut, and the deflected rotating saw blade is relatively retracted away from the cut location toward its initial location.

Preferably, blade deflection is enforced by directing fluid under pressure toward the rotating blade. Desirably, that fluid is directed against at least two locations on the rotating blade on opposite sides of a blade diameter passing through the portion of the blade that is advanced farthest into the cutting zone, and the two locations are generally symmetrically disposed with respect to that diameter.

Other aspects of preferred embodiments of the invention entail continuously directing the fluid against the body of the blade during retraction along such a path as to avoid contact by the fluid with the cutting teeth, particularly where the carbide tipped cutting teeth are employed.

Several workpieces may be supported generally parallel to one another and the blade may be employed to sever each of them into two portions. One portion of each severed workpiece on the same side of the blade is moved away from the cutting location, and the pressurized fluid deflects the blade away from the other portions of each workpiece remaining adjacent the location of the cut. The blade is retracted while maintained in a deflected condition free from contact with all those remaining workpiece portions.

A second rotating saw blade may be traversed toward the workpiece or workpieces for substantially simultaneous workpiece severence at another location. Pressurized fluid is directed against the second rotating blade to deflect it away from the intermediate workpiece portion between the blades, and the second blade may be substantially simultaneously retracted while also maintained free from contact with that intermediate workpiece portion.

First and second drive means are provided for respectively rotating the blade and effecting relative traversing movement between the rotating blade and the workpiece, and suitable conveyor means is employed for moving workpiece portions on one side of the blade away from the location of the cut. First and second fluid jet means are mounted on opposite sides of a blade diameter passing through the blade portion farthest advanced into the cutting zone.

The fluid jet means may comprise extendable and retractable air pads movable toward and away from the cutting plane.

Other objects and advantages of the present invention will become apparent from the subsequent detailed description in conjunction with the accompanying drawings wherein like characters refer to like elements and in which:

THE DRAWINGS

DETAILED DESCRIPTION

Figure 1:
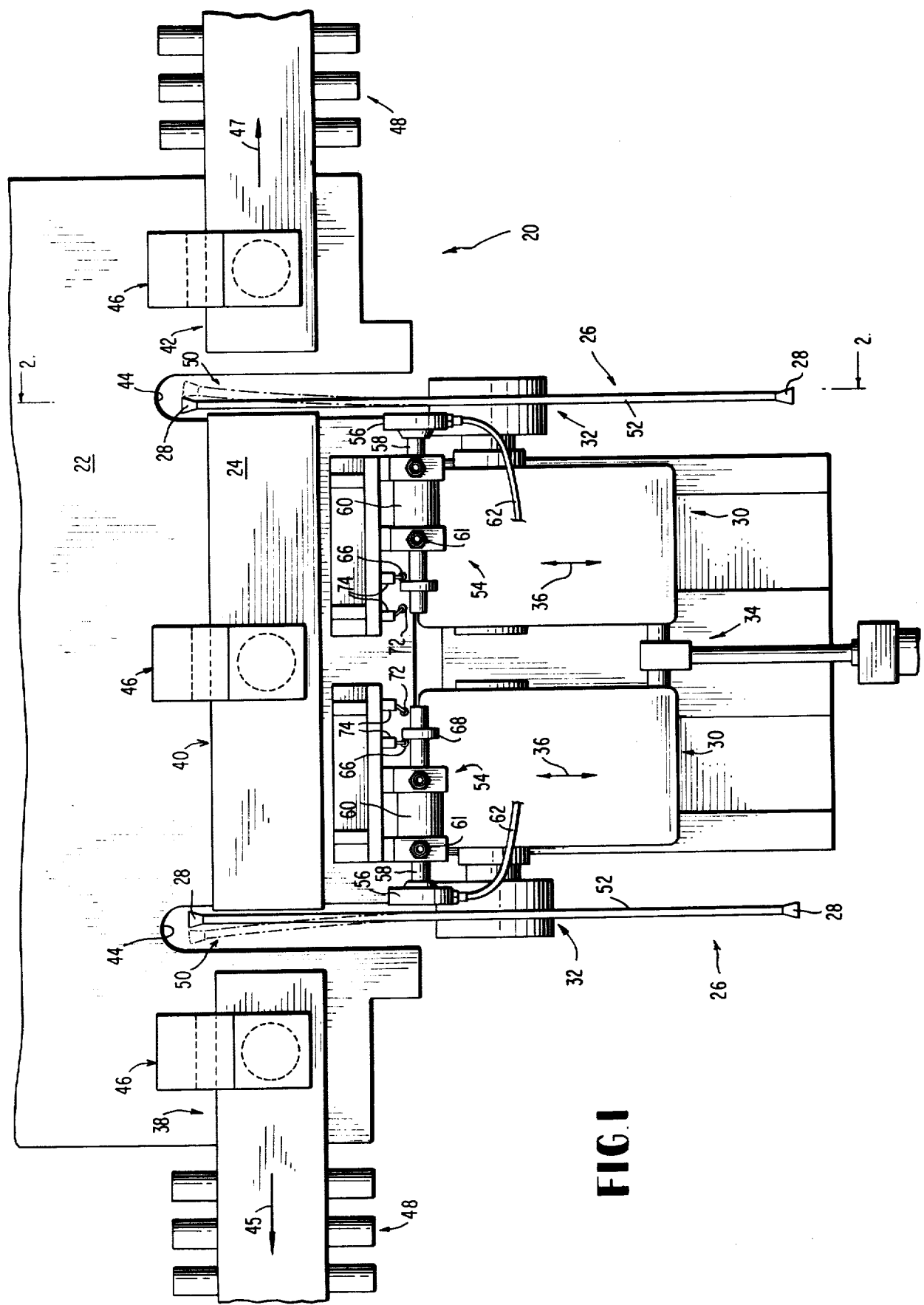
FIG. 1 is a top plan view of a cutting machine schematically depicting principals of the present invention.
Figure 2:
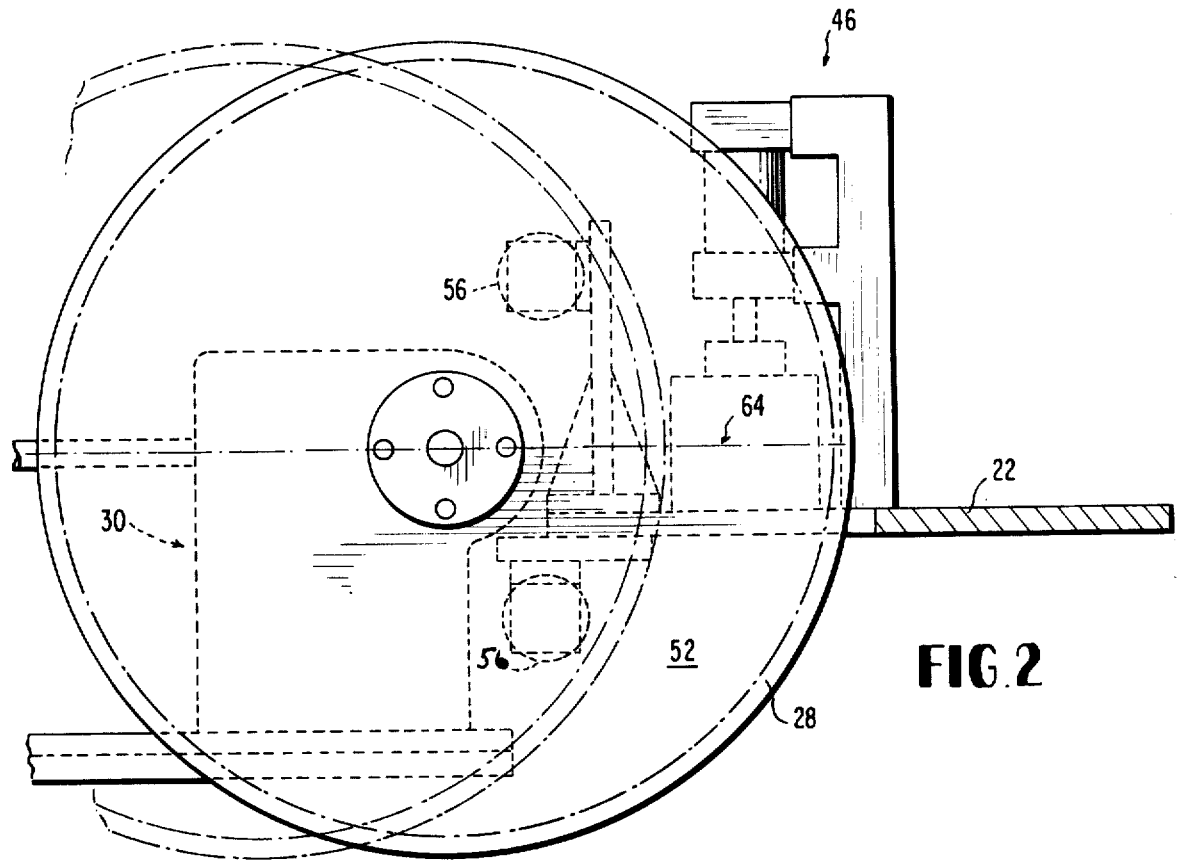
FIG. 2 is a schematic, partial sectional view taken along line 2—2 of FIG. 1.

With reference now to FIGS. 1 and 2 certain aspects of a method and apparatus according to the present invention may be more fully appreciated in conjunction with the schematic illustration of a cutting machine 20.

That machine 20 includes a support table 22 on which a steel workpiece 24 to be severed is supported. Two circular saw blades 26, preferably having carbide tipped cutting teeth 28, are mounted for substantially simultaneous movement transversely of the longitudinal extent of the elongate workpiece 24.

In this connection, two traversing head assemblies 30 are provided. The blades 26 are mounted for rotation on the head assemblies 30 by means of conventional spindle and blade adaptor assemblies 32. These latter assemblies 32 form part of a first drive means for rotating the blades 26 about their central axes.

Any suitable drive means, such as that schematically depicted at 34, may be employed to move the head assemblies 30, and thus the rotating blades, toward the supported workpiece 24, as well as to retract the rotating blades toward their initial position. The direction of blade advancement and retraction is indicated by the double ended arrows 36.

Upon advancement of the rotating blades 26 to the positions indicated in FIGS. 1 and 2, severance of the workpiece 24 into three severed portions 38, 40, and 42 is effected. The support table 22 may be appropriately slotted at the location of the cuts, as indicated at 44, to accomodate reception of the blades during cutting operations.

If desired, suitable clamps, schematically shown at 46 may be mounted on the support table 22 on opposite sides of the cutting zones 44. These clamps may be employed to maintain the workpiece 24 in a fixed position during severance.

Upon release of the clamps 46 associated with the outermost severed workpiece portions 38 and 42, and prior to retraction of the blades 26 toward their initial positions, those outermost workpiece portions are moved away from the cutting zones 44 in the direction of the arrows 45 and 47. As such, interaction between the rotating blades 26 and those outer severed workpiece portions 38 and 42 will be avoided during blade retraction. In FIG. 1, the outer workpiece portions 38 and 42 are shown in their displaced positions.

For this purpose, any suitable conveyor means such as the driven roller conveyor assemblies depicted at 48 may be utilized. In appropriate circumstances, the outer severed workpiece portions 38 and 42 may be moved away from the cutting zones 44 by the action of gravity. Alternatively, the outer clamps 46 may be mounted on slides, and those workpiece portions 38 and 42 may be moved by displacing the slides while the clamps are engaged.

In accordance with the present invention, interaction between the retracting blades 26 and the intermediate, remaining workpiece portion 40 is also avoided without the need for moving that workpiece portion 40. As will be appreciated, the intermediate workpiece portion 40 is essentially trapped between the blades 26. However, the blades 26 are deflected away from the ends of that workpiece section 40 prior to blade retraction. The deflected condition of the blades 26 is depicted in phantom in FIG. 1 at 50.

Deflection of each blade 26 to allow for retraction free from engagement with the intermediate workpiece portion 40 is preferably accomplished by directing fluid under pressure against the body 52 of the blade. For this purpose, air or other fluid jet assemblies 54 are provided.

In the illustrated embodiments of the invention, the jet assemblies are comprised of air bearings or air pads 56 suitably fixed to a piston rod 58. Extension of the piston rods 58 toward the cutting zones and retraction therefrom is controlled by the application of fluid to control cylinders 60 through inlet and outlet conduits 61.

In addition, fluid is supplied to the air pads through counduits indicated at 62. Circular bearing pads 56 of the type commercially available from the Apex Bearing Company, 86 Owen Brown Street, Hudson, Ohio under the designation LMAB (linear motion air bearing) 03875 have been found suitable for practice of the present invention, utilizing pressures of about 100 pounds per square inch against a 36 inch diameter steel body blade of about 0.28 inch thickness.

Preferably at least two air pads 56 are associated with each blade, and these are mounted to direct pressurized fluid against the blade body 52 in at least two locations on opposite sides of a blade diameter passing through the portion of the blade 26 that is advanced farthest into the cutting zone. That leading diameter is indicated at 64 in FIG. 2.

Positioning of the air pads 56 in those locations enhances deflection of the blade body section in the cutting zone away from the cutting plane. Desirably the at least two locations toward which the fluid is directed are symmetrically disposed in relation to the leading blade diameter 64.

With further regard to the positioning of the air pads 56, it is noted that they are positioned to direct air against the blade body 52 along fluid paths such that the blade 26 can be completely retracted from the cutting zone 44 without the air jet paths impinging upon the carbide tipped cutting teeth 28. This relationship between the fluid and the retracted position of the blade is depicted in FIG. 2 by the phantom illustration of the blade.

Figure 3:
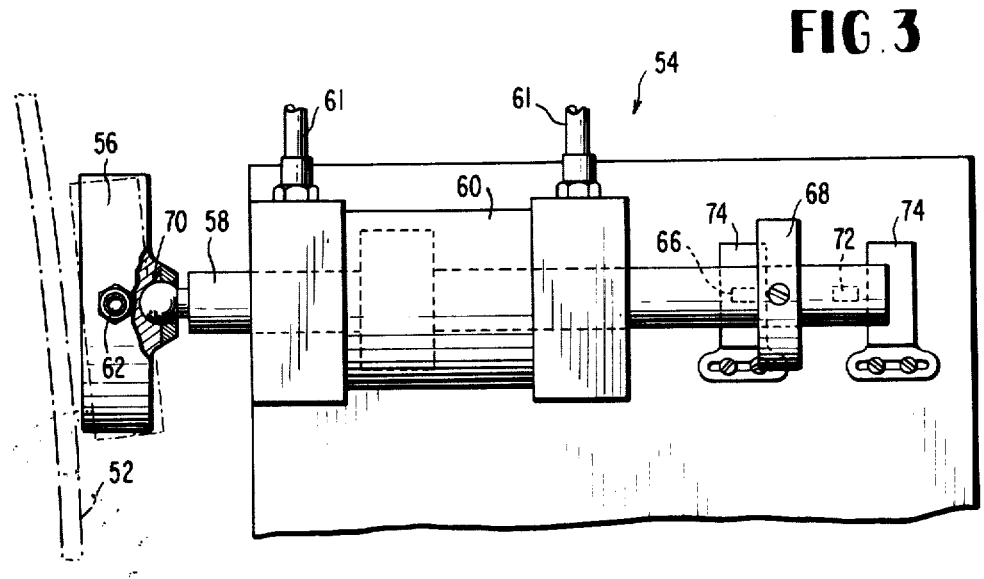
FIG. 3 is a side elevational view illustrating blade deflection means employed according to the present invention.

Referring now to FIG. 3, further details of the operation of each air pad 56 may be appreciated. After completion of the cut, an appropriate signal is provided to initiate extension of the piston rod 58 on which the pad 56 is mounted. At the same time, the supply of air through the pad inlet line 62 is commenced.

The pad is extended by a distance which would place it closely adjacent, but preferably not touching, the blade body 52. A limit switch 66 cooperates with a cam 68 on the trailing end of the double ended rod 58 to control the extension of the pad 56.

As will be appreciated, when the pad 56 approaches the blade body 52, it directs a stream of air generally normal to that body. When the blade begins to deflect there will at least initially be a tendency for an angle to be established between the leading face of the pad and the deflected portion of the blade body. However, a pressure differential between that face of the pad and the deflected portion of the blade body is established in an amount proportional to the angle therebetween. This pressure differential causes the pad to assume an angled position relative to the piston rod 58 on which it is mounted so as to bring the front face of the pad into generally parallel relationship with the deflected portion of the blade body, thereby bringing the air jet path into generally perpendicular relationship to the deflected portion of the blade body.

As further deflection of the blade occurs, this self-centering action continues to maintain the described relationship. In this connection, it will be noted that a swivel joint connection indicated at 70, is employed between the pad 56 and the piston 58 to accommodate the centering movement of the pad. The pad is depicted in phantom in FIG. 3 in its centered position relative to the deflected blade.

When the blade is retracted clear of the intermediate workpiece section 40, an appropriate signal initiates retraction of the piston rod 58 and the pad carried thereby. The cam 68 on the double ended rod 58 cooperates with a limit switch 72 to stop the retraction of the pad in the desired position and signal termination of the supply of air to the pad, thereby conditioning the unit for the next blade deflection operation. If desired, the limit switches 66 and 72 may be mounted on adjustable plates 74 to allow for selective alteration of the limit positions.

In the next operation, the previously described self-centering action will properly orient the now angled pad 56.

After blade retraction the intermediate workpiece portion 40 is unclamped and removed from the support table 22 in any suitable manner, and a new workpiece 24 is positioned on the table.

Although the foregoing description of the embodiment of the invention schematically depicted in FIGS. 1 through 3 has been described in connection with multiple simultaneous cuts of a single workpiece 40, it will be appreciated that one of the heads 30 may be eliminated and sequential longitudinally spaced cuts of a longitudinally inclined workpiece may be made by the blade 26 mounted on the other head. In such instances, the leading one of the severed workpiece portions formed by the cutting operation may be moved away from the cutting zone 44 and the blade may be deflected away from the other severed workpiece portion during blade retraction.

In addition, the present invention has applicability in connection with simultaneous multiple cuts of plural, parallel workpieces suitably supported on the table, and in connection with sequential, longitudinally spaced cuts of such plural, parallel workpieces. In such instances, the blade is deflected away from all severed workpiece portions on one side of the cutting zone 44 and is retracted free from contact with all such pieces.

Figure 4:
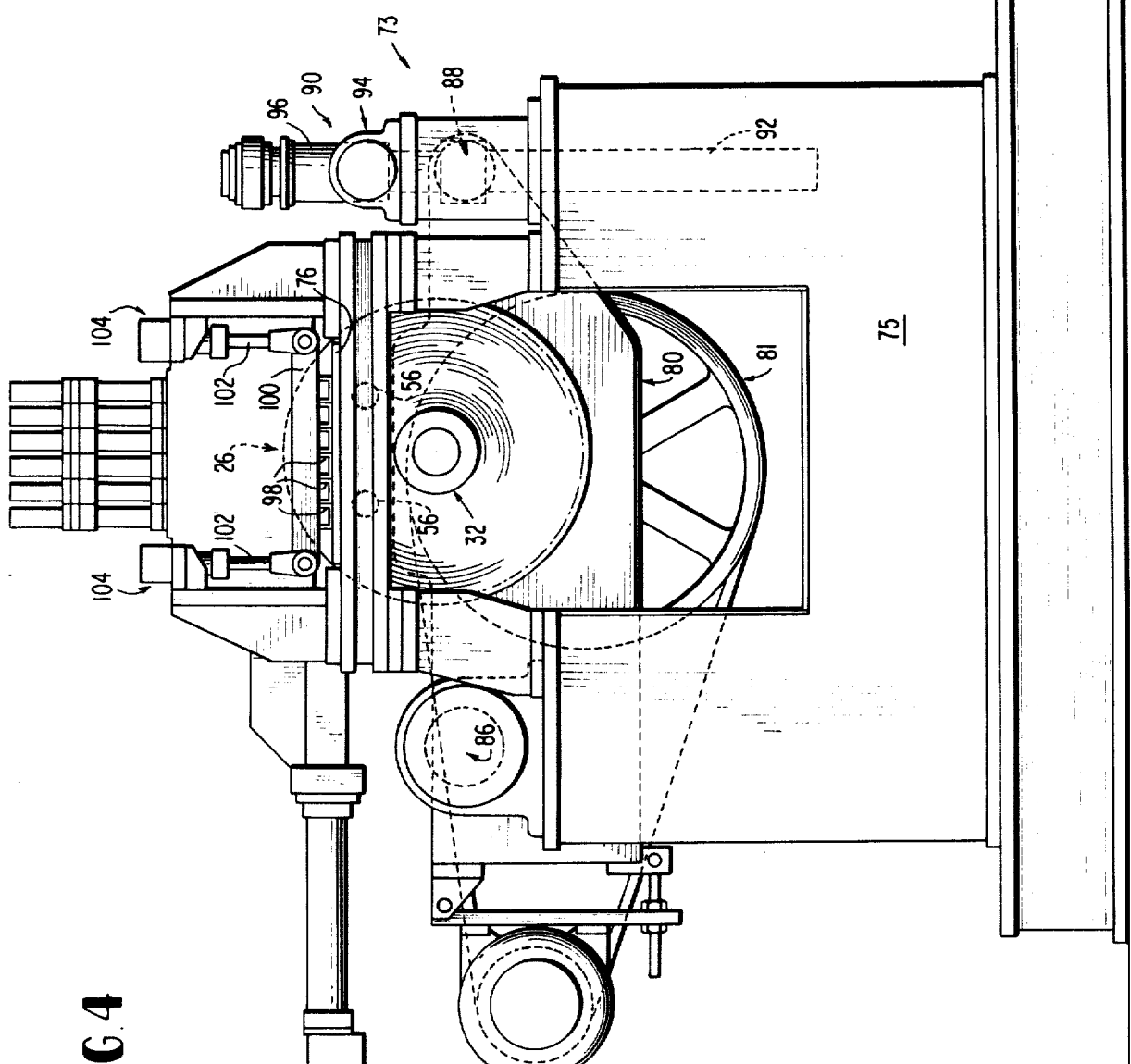
FIG. 4 is a side elevational view of a further embodiment of a cutting apparatus according to the present invention.
Figure 5:
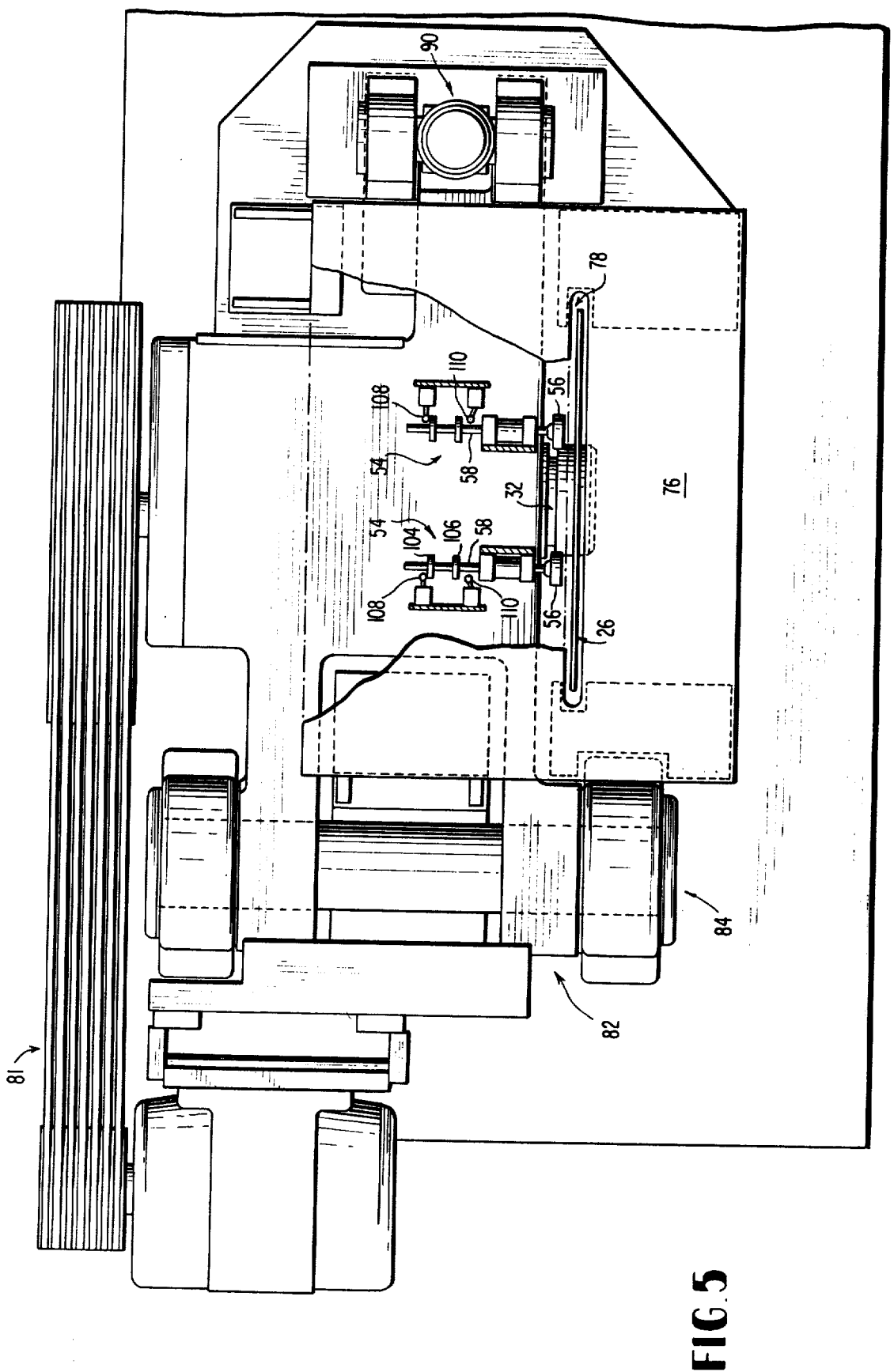
FIG. 5 is a top plan view, partially broken away, of the apparatus of FIG. 4.

Turning now to FIGS. 4 and 5, an illustration of a further form of a cutting machine 73 for carrying out the present invention particularly adapted for simultaneous severance of a plurality of workpieces may be seen. That machine 73 includes a base 75 on which a workpiece support table 76 is mounted. The support table is provided with a generally central, longitudinally extending slot 78.

Mounted within the base 75 for pivotal movement toward and away from the slot 78 within the confines of the base 75 is a head assembly 80 which supports a blade 26. The blade 26 is rotatably driven by a drive means including a belt and pulley assembly 81 and a spindle and blade adaptor assembly 32.

The head assembly 80 includes one bifurcated arm unit indicated at 82. This unit is pivotally mounted by a trunnion assembly 84 for arcuate movement of the head assembly 80 about an axis indicated at 86 (FIG. 4). At the other end of the head assembly, a pivotally mounted projection indicated at 88 is provided. A drive assembly indicated at 90 cooperates with this projection 88 to cause movement of the head assembly toward and away from the support table slot 78.

This drive assembly 90 includes a drive screw shaft 92, a pivotally mounted housing 94, and a hydraulic motor 96 for reversibly rotating the drive screw shaft 92. When the screw shaft 92 is rotated, it pivots the head assembly 80 by displacing the projection 88 with which it is in threaded operative engagement. The drive assembly 90 is allowed to pivot by reason of the pivotally mounted housing 94.

As the head assembly 80 is pivoted toward the support table slot 78, the rotating blade 26 is projected through that slot to effect severance of a plurality of generally parallel workpieces 98 supported so as to overlie the slot and extend traversely of the direction of the blade advance.

In the illustrated arrangement, the workpieces 98 are generally U-shaped chanels clamped against the upper surface of the support table 76. The clamping mechanism for this purpose may include at least one hold down bar 100 attached to piston rods 102 of piston and cylinder assemblies 104.

Figure 6:
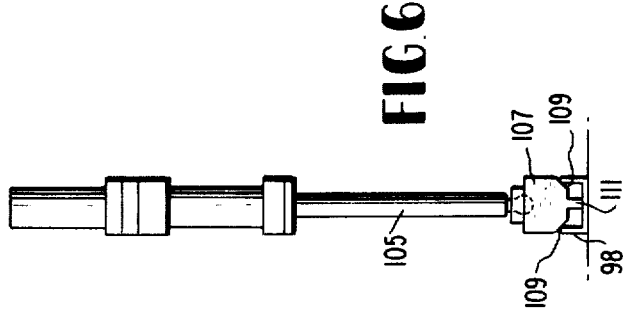
FIG. 6 is a schematic side view of one of the clamps employed in the machine of FIG. 4.

Additional piston operated clamp fixtures not shown in FIG. 4, but depicted in FIG. 6) may include a rod section 105 extending generally perpendicular to the associated bar and a seating member 107 swivelably supported by the rod section. The seating members may include chamfered ends 109 that seat against the upper legs of the channels and a bottom projection 111 that seats against the channel web. Thus, the channels may be engaged by the hold down bar 100 as well as in three locations by each seating section when the piston rods 102 and 105 of the clamping mechanism are extended, with the seating member being permitted to pivot and accomodate for variations in workpiece dimensions, etc.

After severance of the channels by the blade with the carbide tipped cutting teeth, those severed channel sections on one side of the slot 80 are unclamped and moved away from the cutting zone, i.e., the slot. For this purpose roller conveyors such as those shown in FIG. 1, or other suitable conveyors may be employed. The blade is then deflected away from the remaining workpiece sections and is retracted free from engagement therewith.

To enforce blade deflection, fluid jet assemblies 54 including air pads 56 are employed. These fluid jet assemblies 54 are suitably mounted to the support table 76. Inasmuch as their structure and operation is the same as that described in connection with FIGS. 1–3, they need not be described in detail. It need only be noted that they are mounted relative to the path of blade movement so that they direct fluid streams against the blade body at two locations substantially symmetrically disposed on opposite sides of the blade diameter extending to the most forwardly advanced portion of the blade, and that the jet paths are such as to avoid impinging upon the cutting teeth when the blade is fully retracted. If desired, the double ended rod 58 of the jet assemblies may include two cams 104 and 106 cooperating with limit switches 108 and 110 to predetermine the extension and retraction of the pads 56.

If desired, two machines 72 may be placed side by side to effect substantially simultaneous severance of the workpieces at longitudinally spaced locations.

From the foregoing, it will be apparent that in accordance with the present invention, interaction between severed workpiece portions and a retracting cutting tool is avoided by blade deflection, thus avoiding the need for moving workpiece sections on both sides of the cutting tool. Although the invention has been described with reference to preferred forms thereof, it will be appreciated by those skilled in the art that additions, modifications, substitutions, and deletions may be amde without departing from the the spirit and scope of the invention a defined in the appended claims.

What is claimed is:

1. A method of severing a workpiece with a rotatable saw blade, the method comprising:
   effecting relative traversing movement between the rotating saw blade and the workpiece to sever the workpiece into two portions,
   moving one of the workpiece portions away from the location of the cut,
   deflecting the rotating saw blade away from the location of other workpiece portion, and
   relatively retracting the deflected rotating saw blade away from the location of the cut toward its initial position.

2. The method according to claim 1 wherein the step of deflecting comprises:
   directing fluid under pressure toward the rotating blade.

3. The method according to claim 2 wherein the fluid under pressure is directed against at least two locations on the rotating blade on opposite sides of a blade diameter extending toward the portion of the blade farthest advanced toward the workpiece.

4. The method according to claim 3 wherein said at least two locations are generally symmetrically disposed with respect to said diameter of the saw blade.

5. A method of severing a workpiece with a rotatable saw blade, the method comprising:
   traversing the rotating saw blade toward the workpiece to sever the workpiece into two portions,
   moving one of the workpiece portions away from the location of the cut,
   directing pressurized fluid against the rotating blade to deflect the blade away from the other workpiece portion remaining adjacent the location of the cut, and
   retracting the rotating saw blade away from the cut location toward its initial position while maintaining the blade in its deflected condition free from contact with said remaining workpiece portion.

6. The method according to claim 5 wherein the blade is comprised of a body with carbide tipped cutting teeth and the pressurized fluid is continuously directed against the body of the blade during retraction.

7. The method according to claim 6 wherein the pressurized fluid is directed against at least two locations on the rotating blade body on opposite sides of a blade diameter extending toward the portion of the blade farthest advanced toward the workpiece.

8. The method according to claim 7 wherein said at least two locations are generally symmetrically disposed with respect to said diameter of the saw blade.

9. The method according to claim 5 wherein:
   the blade is traversed toward a plurality of generally parallel workpieces to sever each of them into two portions,
   one portion of each severed workpiece on the same side of the blade is moved away from the cutting location,
   the pressurized fluid deflects the blade away from the other portions of each workpiece remaining adjacent the location of the cut, and
   the rotating blade is retracted while maintained in a deflected condition free from contact with all said remaining workpiece portions.

10. The method according to claim 5 wherein
    a second rotating saw blade is traversed toward the workpiece substantially simultaneously with movement of the first mentioned saw blade, to sever the workpiece and provide a third workpiece portion,
    the third workpiece portion is moved away from the location of the cut by the second blade,
    pressurized fluid is directed against the second rotating blade to deflect it away from said remaining workpiece portion, and
    during retraction of the first mentioned blade the second rotating blade is retracted toward its initial position while maintained free from contact with said remaining workpiece portion.

11. The method acccording to claim 10 wherein
    both blades are traversed toward a plurality of generally parallel workpieces to sever each of them into three portions,
    the outside severed portions of each workpiece are moved away from the cutting locations,
    the pressured fluid deflects both blades in opposite directions away from each of the intermediate remaining workpiece portions, and
    the rotating blades are retracted while maintained in deflected conditions free from contact with the intermediate remaining workpiece portions.

12. In a method for severing a workpiece with a cutting tool which is moved toward the workpiece to sever it into two portions and is retracted away from the location of the cut while maintained out of contact with the severed workpiece portions, the improvement wherein:
    the cutting tool is retracted after movement of one of the workpiece portions away from the cutting zone and while maintained in an enforced deflected condition out of contact with the remaining workpiece portion.

13. The improvement according to claim 12 wherein deflection of the cutting tool away from the remaining workpiece portion is enforced by directing pressurized fluid toward the cutting tool.

14. Apparatus for severing a workpiece, comprising:
a rotatable saw blade,
first drive means for rotating said blade,
second drive means for effecting relative traversing movement between the rotating blade and the workpiece to cut the workpiece into two portions, and for effecting relative retraction of the blade toward its initial position
means for moving one of the workpiece portions away from the location of the cut, and
means for deflecting the rotating saw blade away from the remaining workpiece portion during said relative retraction.

15. Apparatus according to claim 14 wherein said deflecting means comprises means for directing pressurized fluid toward the rotating blade.

16. Apparatus according to claim 15 wherein said pressurized fluid directing means comprises first and second fluid jet means mounted on opposite sides of a blade diameter extending toward the portion of the blade farthest advanced toward the workpiece.

17. Apparatus according to claim 16 wherein said fluid jet means comprise extendable and retractable air pads movable toward and away from the cutting plane.

18. Apparatus according to claim 15 including:
a second rotatable saw blade relatively movable toward and away from the workpiece to cut the workpiece and provide a third workpiece portion,
means for moving the third workpiece portion away from the location of the cut by the second blade, and
second deflecting means for directing fluid toward said second blade to deflect it away from said remaining workpiece portion.

19. Apparatus according to claim 18 including:
support means for supporting a plurality of generally parallel workpieces in position for severence together by said first and second blades.

20. Apparatus according to claim 15 including:
support means for supporting a plurality of generally parallel workpieces in position for severence together by said blade.

21. In an apparatus for severing a workpiece including: a rotatable saw blade with carbide tipped cutting teeth, means for moving said blade toward the workpiece to sever it into two portions and for retracting it away from the location of the cut, and means for maintaining the rotating blade out of contact with the severed workpiece portions during retraction, the improvement comprising:
deflection means for deflecting the rotating blade during retraction.

22. The improvement according to claim 21 wherein said deflection means comprises means for directing pressurized fluid against said blade.

23. The improvement according to claim 21 including a mounting means mounting said pressurized fluid directing means in a position to direct fluid along a path out of contact with the cutting teeth during blade retraction.

* * * * *